Nov. 23, 1965     R. E. MEYERS ETAL     3,219,729
MIXED NEUTRAL VINYL RESIN/REACTIVE VINYL RESIN COATING
COMPOSITIONS, AND CANS AND/OR CONTAINER
COMPONENTS COATED THEREWITH
Filed Sept. 27, 1961
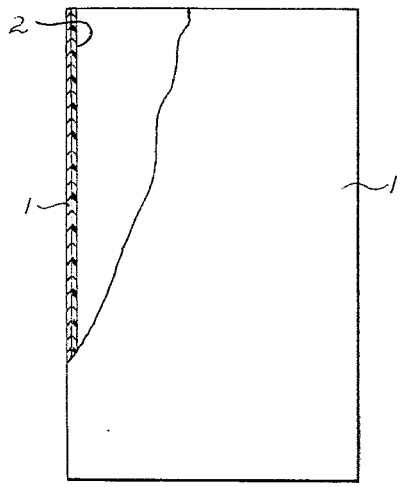
FIG. I
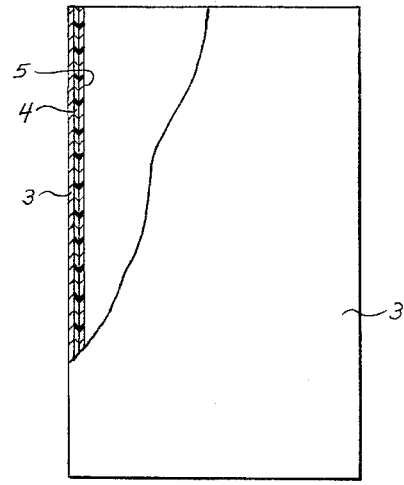
FIG. II
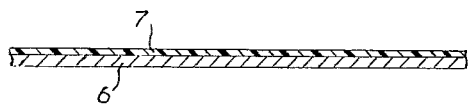
FIG. III
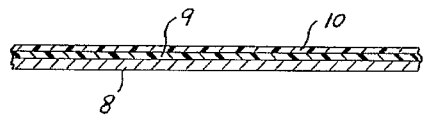
FIG. IV
RAYMOND E. MEYERS
EDGAR W. EUBANKS
               INVENTORS
BY *G. G. Christensen*
               ATTORNEY

United States Patent Office 3,219,729
Patented Nov. 23, 1965

3,219,729
MIXED NEUTRAL VINYL RESIN/REACTIVE VINYL RESIN COATING COMPOSITIONS, AND CANS AND/OR CONTAINER COMPONENTS COATED THEREWITH
Raymond E. Meyers, North Riverside, and Edgar W. Eubanks, Chicago, Ill., assignors to The Glidden Company, Cleveland, Ohio, a corporation of Ohio
Filed Sept. 27, 1961, Ser. No. 141,064
10 Claims. (Cl. 260—899)

This invention relates to coated metal cans and/or closures (e.g. lids, caps, etc.) for food containers, and to the liquid coating compositions used for preparing such and related coated metal articles. The invention relates more specifically to the use of certain neutral (i.e. nonacidic) vinyl chloride copolymer resins as the principal film-forming material blended with small amounts of certain reactive vinyl chloride/vinyl acetate copolymer film-forming resins, the blend of said resins yielding a novel coating composition when dissolved in inexpensive solvents to form a homogeneous, single-phase solution.

When the said organic solvent solution of such blend of copolymers is applied to bare or primed sheet metal and baked to form a continuous film, the resulting coated metal exhibits the qualities of merit presently required by coated can manufacturers for cans used to contain foods and beverages.

Food-contacting resinous films for cans, lids, etc. are tested carefully by can manufacturers to evaluate their qualities in respect to various conditions of use. The foremost testing procedures used to evaluate the merits of such linings are commonly identified by the terms "blush resistance," "adhesion" and "fracture." Blush-resistance is a qualitative measure of the resistance of the film to development of filmy, whitish spots in the film after the film has been in contact with various foods and/or beverages during a pasteurization treatment, and the quality is determined experimentally by means of a test simulating the exposure of the film to said foods when the latter are sterilized in the usual canning of said foods. The "adhesion" of the film to the substrate (whether it be a priming film or the metallic surface per se) is measured qualitatively by a "Scotch" tape test which is usually carried out on the film being tested after the aforementioned pasteurization test. The "fracture" measures the ability of a coated metal sheet to withstand the forming operations involved in fabricating the coated sheet into can bodies, can ends, jar lids, bottle caps and closures, and other container components. The fracture test is usually applied to a specimen of the coated sheet after subjecting the specimen or the coated sheet to the usual pasteurization treatment, but various forms of the test can be applied to the specimen prior to the said pasteurization treatment. As used herein, the "fracture" tests give results secured after pasteurization.

We have found that our above-described blended copolymer coating compositions yield coated metal articles which successfully pass the can-maker's tests for "blush resistance," "adhesion" and "fracture," and hence are acceptable for the prolonged exposures involved in canned foods and beverages. Moreover, the resinous linings have been found to be satisfactory in respect to not altering the flavor or taste of the canned foods and beverages on prolonged contact.

Accordingly one object of our invention is to provide novel coated metal articles having the form of sealed cans or having the form of flat sheets of can bodies, of can ends, and/or of caps, lids, etc., said sealed cans and all of the latter forms being serviceable for use as or in containers intended to package foods and/or beverages with the resinous film in contact with the contents of the container.

Another object is to provide novel coating compositions adapted for use in forming can linings, the film-forming materials of said coating compositions being a blend of two different types of thermoplastic vinyl chloride copolymer, resins, which types have been described briefly above and are identified more particularly hereinafter.

A further object is to provide coating compositions of the kind described in the previous object, which compositions employ inexpensive volatile solvents and otherwise meet current cost requirements for can linings.

Other objects will be apparent from the following description of our invention taken in conjunction with the attached sheet of drawings in which all thickness dimensions are exaggerated for clarity and in which:

FIGURE I is an elevational view of a cylindrical metallic can body having a baked resinous lining directly carried on the inside surface of said can body, a portion being broken away to reveal said interior lining;

FIGURE II is an elevational view of a cylindrical metallic can body having both a baked resinous basecoat and a baked resinous topcoat forming a lining on the inside surface of said can body, a portion being broken away to reveal the double interior lining; and FIGURES III and IV are vertical sectional views of flat metal sheets carrying one and two baked linings respectively on a surface thereof, from which can ends can be stamped for closing the ends of the can bodies of FIGURES I and II respectively.

As pointed out above, our novel coating compositions employ a blend of two different types of vinyl chloride copolymer resins. The type used in the predominant amount in the blend is either or both of two specific formulations of neutral copolymers, while the type used in a small amount in the blends is either or both of two specific formulations of reactive copolymers.

The neutral resins possess excellent resistance to blush, but are somewhat lacking in adhesion and hence in fracture resistance. The reactive resins identified below have been found to be compatible with the neutral resins, to confer to the blend the needed qualities of adhesion and fracture resistance, and not to impair the blush resistance of the neutral resins. Thus the blend provides the needed requirements of a film for can linings whereas in the situations in question the individual components thereof alone would be unsatisfactory.

The two types of resins employed in the blend of film-formers, and the solvent component used to convert said blend of resins to a liquid coating composition, will now be described under their separate headings.

THE NEUTRAL RESINS

Either or both of two resin formulations can be used in providing the neutral resin component of our coating compositions. The formulations are, for convenience of reference, identified here as Class A and Class B, respectively.

As will be understood, the resin solids of these coating compositions are composed entirely of neutral, thermoplastic, non-thermal-setting vinyl chloride copolymers. These copolymers can be formulated according to the requirements of either of the following two groups or classes:

CLASS A COPOLYMERS

| Monomer Component | Weight Percent Range | |
|---|---|---|
| | Maximum | Preferred |
| Vinyl chloride | 55-77 | 65-77 |
| Neutral diesters [1] | 45. 23 | 33-23 |
| Optional relative viscosity modifier [2] (Based on 100 parts of monomer) | 1. 0-6. 5 | 1. 7-6. 0 |
| Relative viscosity [3] | 1. 26-1. 60 | 1. 30-1. 50 |

CLASS B COPOLYMERS

| Monomer Component | Weight Percent Range | |
|---|---|---|
| | Maximum | Preferred |
| Vinyl chloride | 55-80 | 67-75 |
| Neutral diesters [1] | 3-23 | 6-20 |
| Neutral acrylic esters [4] | 1-22 | 6-20 |
| Optional relative viscosity modifier [2] (Based on 100 parts of monomer) | 1. 0-6. 5 | 1. 7-6. 0 |
| Relative viscosity [3] | 1. 27-1. 60 | 1. 30-1. 50 |

[1] These are diesters of $\alpha,\beta$ unsaturated $\alpha,\beta$ dicarboxylic acids selected from the group consisting of maleic acid, chloromaleic acid and fumaric acid, each alcohol radical of said diesters being a hydrocarbon radical of 1-10 carbon atoms (e.g. alkyl, aryl, cycloalkyl, or alkaryl) substantially free of ethylenic unsaturation.
[2] The optional relative viscosity modifiers are described hereinafter under a corresponding main heading. The modifiers are optional because a heat treatment described hereinafter can be used in their stead to secure the indicated values of relative viscosity.
[3] The relative viscosity of the copolymers is determined at a 1.0 wt. percent level in cyclohexanone.
[4] The acrylic esters are alkyl esters of acrylic and/or methacrylic acids, each alkyl group thereof containing 6-12 carbon atoms.

It will be seen that the Class B copolymers are a modification of the Class A copolymers in which a part of the monomeric diester(s) of the latter is replaced and/or augmented with neutral alkyl monomeric ester(s) of acrylic and/or methacrylic acid(s).

Either of the Class A or Class B copolymers can be prepared from a single monomeric diester or from mixtures of two or more monomeric diesters. Likewise, the Class B copolymers can be made from a single acrylic-type monoester monomer or from a mixture of two or more of such monoester monomers. Likewise mixtures of the Class A and Class B copolymers can be used.

In both classes of copolymer we prefer to have the unsaturated dicarboxylic acid of the diesters represented by a mixture of maleic and fumaric acids, with at least 50% by weight being fumaric acid. We also prefer to have the alcohol radicals of the diesters represented by the butyl radical, and we especially prefer the n-butyl radical. A commercial material offered as di-n-butyl maleate but actually containing approximately equal proportions of di-n-butyl maleate and di-n-butyl fumarate is especially useful in preparing our preferred copolymers.

The copolymers of this invention can be prepared by mixing together the several monomeric starting materials and subjecting them to any of the usual free-radical polymerization systems and conditions, for instance in solution in solvents, or in emulsion in aqueous media, using free-radical generating catalysts and conditions. In practical production, however, it will usually be preferred to polymerize these materials in suspension in aqueous media by the known suspension polymerization technique. In general this technique involves suspending the monomers in an aqueous medium containing non-miscelle-forming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration.

While 1.5–6.5% trichloroethylene is preferably employed in the preparation of our copolymers as the relative viscosity modifier, (all as set forth in Reissue Patent 24,206, here incorporated by reference) equivalent results can be secured by either (a) omitting all chemical modifier(s) entirely and concomitantly polymerizing the mixture of starting materials at temperatures between 70° and 85° C., preferably 74°–77° C. (all as described in U.S. Patent 2,849,424, here incorporated by reference), (b) by replacing the trichloroethylene with 1–6.5% by wt. of halogenated unsaturated hydrocarbons of the class consisting of cis- and trans-1,2-dichloroethylene, cis- and trans-1,2-dibromoethylene, 1,1 - dichloro - 2 - bromoethylene, allyl chloride, methallyl chloride, allyl bromide, allyl iodide, methallyl bromide, methallyl iodide, 2,3-dibromo-1-propene, 3,3-dichloro-1-propene, 2,3-dibromo-1-propene, 1-chloro-2-butene, 1-chloro-2-2-decene and 1-chloro-2-2-octadecene (all as disclosed in U.S. Patent 2,849,422, here incorporated by reference), or (c) by replacing the trichloroethylene with 1–6.5% by wt. of halogenated hydrocarbons containing up to 16 carbon atoms and containing up to 5 halogen atoms selected from the group consisting of fluorine, bromine and iodine. These are exemplified by the halogenated methanes, such as carbon tetrachloride, carbon tetrabromide, bromochlorodifluoromethane, bromoform, methyl chloride, methyl bromide, methyl iodide, chloroform, iodoform methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes, such as n-propyl chloride, n-propyl iodide, isopropyl chloride, isopropyl bromide, n-butyl chloride, 1,4-dichlorobutane, t-butyl chloride, and the like. Suitable higher halogenated hydrocarbons include for instance amyl chloride, dodecyl bromide, dodecyl iodide, the dichloropentanes, hexadecyl chloride and the like. The use of such halogenated hydrocarbons in place of trichloroethylene is disclosed in U.S. Patent 2,849,423, here incorporated by reference.

The exact function of the trichloroethylene or of the various compounds or mixtures thereof which can be used as relative viscosity modifiers to replace it in the polymerization process is not fully understood; possibly they act as chain terminators or transfer agents, or perhaps they affect the growing polymer chains in some manner not yet elucidated. At any rate polymers produced in the absence of such materials and outside of the temperature range of 70–85° C. do not possess the desirable properties which render our baked films appropriate for use as can linings. When the starting materials are either polymerized in the presence of such modifiers, or in the absence of such modifiers but within the temperature range of 70–85° C., the finished products are found to have relative viscosities (in 1% cyclohexanone solution) ranging between about 1.27 and 1.60 and more preferably between about 1.30 and 1.5.

If desired or necessary to remove the modifiers at the completion of the polymerization, this can be done by means of vacuum drying, solvent extraction or the like.

In connection with the four U.S. patents mentioned above and incorporated by reference, it should be noted that they disclose the preparation of only acidic copolymers. By omitting the acidic half-esters, and formulating within the ranges disclosed above, one can utilize fully all the teachings of said patents in preparing the neutral copolymers of the present invention.

The Class A and/or B copolymers constitute, in toto, about 90–99 wt. percent of the resin solids of our coating compositions.

THE REACTIVE RESINS

Either or both of two resin formulations set forth below can be used to provide the 1–10 wt. percent of reactive resin solids constituting the reactive resin component of our blended neutral resin/reactive resin coating compositions. For convenience or reference, the two formulations are here identified as Class C copolymers and Class D copolymers, respectively.

CLASS C COPOLYMERS

*Vinyl halide/vinyl ester/maleic and/or fumaric acid(s) copolymers*

These are conventional resins which are a copolymer of a vinyl halide, a vinyl ester of a lower aliphatic monocarboxylic acid, and an acidic component; i.e. maleic acid, fumaric acid, maleic anhydride and/or lower alkyl half esters of maleic and/or fumaric acid in which the alkyl group(s) contains up to 6 carbon atoms, e.g. methyl, ethyl, propyl, butyl and higher homologues. The lower aliphatic acids of the vinyl ester(s) are those containing up to 6 carbon atoms, such as acetic, propionic, butyric and higher aliphatic homologues.

Vinyl chloride, vinyl acetate and maleic anhydride and/or fumaric acid are the preferred monomeric components and are advantageously employed in amounts such that the percentage of vinyl chloride lies between 65% and 91%, the percentage of vinyl acetate lies between about 35% and 9%, and the percentage of maleic anhydride and/or fumaric acid lies between about 0.2% and 5%, all percentages being by weight. By simple molecular weight ratios is obvious that an "acidic content" of 1%, based on maleic anhydride, is equal to 1.18% of maleic acid or fumaric acid, is equal to 1.33% of monomethyl maleate or fumarate, is equal to 1.47% of monoethyl maleate or fumarate, etc. Throughout the specification and claims it will be understood that percentage figures for "acidic content" are based on maleic anhydride; conversion to equivalent percentages of other maleic and/or fumaric components is a simple calculation.

The percentages of the starting components set forth in the preceding paragraph apply equally well to the broader class of resins described in the first paragraph above, and all are here identified as Class C resins.

Several preferred compositions for Class C resins are as follows:

| Monomers: | Percent by wt. |
|---|---|
| (a) Vinyl chloride | 70 |
| Vinyl acetate | 28.7 |
| Maleic anhydride | 1.3 |
| (b) Vinyl chloride | 65.0 |
| Vinyl acetate | 34.2 |
| Maleic and/or fumaric acid | 0.8 |
| (c) Vinyl chloride | 87.0 |
| Vinyl acetate | 11.8 |
| Maleic anhydride | 1.2 |

For convenience we shall sometimes hereafter refer to the maleic and/or fumaric modified copolymers which form our Class C resins as "acid-modified vinyl halide/vinyl ester copolymers."

The degree of polymerization of the copolymers of Class C resins should be controlled within fairly close limits to the end that the finished copolymers are compatible with the Class A and/or Class B copolymers employed in practicing the invention. We advantageously employ copolymers having molecular weights in the range of 5,000 to 20,000 as determined by the Staudinger viscosity method, and we prefer molecular weights between about 8,000 to 14,000. Commercial compositions meeting our preferences are currently available, one product being available under the Vinylite VMCH, a copolymer of about 86% vinyl chloride, about 13% vinyl acetate, and about 1%–2% of maleic anhydride, said copolymer having an intrinsic viscosity of 0.50–0.55 as measured in cyclohexanone at 20° C. Another analogous product is Vinylite VXCC, which differs from VMCH in being of lower molecular weight.

Another analogous resin using fumaric acid as the acidic component (about 1–2%) is available under the trade name of Geon 440 x 12. The maleic counterpart of this resin is identified as Geon 400 x 110.

CLASS D COPOLYMERS

*Vinyl halide/vinyl ester/(vinyl alcohol) copolymers*

This class of resins is like the Class C resins in respect to the vinyl halide(s) and vinyl ester(s) employed in its preparation, but omits the acidic component of the Class C resins. The proportions of the two components are as described for the Class C resins and hence will not be repeated for this reason. The same preferences as to kinds of halides and esters apply. Since the vinyl alcohol of the Class D terpolymer identified in parenthese above is secured by partial hydrolysis of the vinyl halide/vinyl ester copolymer it is apparent that the vinyl alcohol content is secured from the described binary copolymer at the expense of at least one of the other components. We prefer a vinyl alcohol residue content between about 3% and 10% by weight with a vinyl acetate residue content of at least 3% by weight.

As in the resins of Class A, the molecular weight (rather than intrinsic viscosity) of the vinyl halide/vinyl ester copolymer which is subsequently hydrolyzed should be controlled to fall within the ranges set forth for Class C resins so that the resulting hydrolyzed product will be compatible with the Class A and/or Class B copolymers.

A commercial product which can be used advantageously as a Class D resin is available under the name Vinylite VAGH, a copolymer of about 91% vinyl chloride, about 3% vinyl acetate and about 6% vinyl alcohol; intrinsic viscosity is 0.55–0.59 as measured in cyclohexanone at 20° C. at 1% concentration.

THE SOLVENT COMPONENT

The Class A and/or Class B resins are blended with the Class C and/or Class D resins in one or more solvents; that is, by using a solvent component which converts the mixture of resins to a homogeneous, single-phase solution. While any volatile solvent or solvent mixture producing the desired single-phase solution can be used to prepare our coating compositions, the various resins are soluble in low cost aromatic hydrocarbon solvents such as benzene, toluene, xylene, etc. in substantial amounts (e.g. up to about 35% of resin(s), based on the total weight of the solution). Hence it is economically desirable to use major amounts of such solvents in a solvent mixture. Aliphatic hydrocarbon solvents (e.g. naphthas, mineral spirits, etc.) can be used along with such low cost aromatic solvents in amounts up to about 40% by weight, based on the total weight of the solvent component, or such aliphatic solvents can, if desired, be omitted all together. In most instances, it will be found beneficial in respect to cost, application qualities, evaporation rates, etc. to include in the hydrocarbon solvent(s) minor amounts (e.g. 7–40% by weight) of strong solvents and mutual solvents such as ketones, 1–6 carbon alkyl acetates, 1–4 carbon alkanols, alkylene-and/or polyalkylene glycol monoalkyl ethers having 1–4 carbons in each alcohol radical thereof, and/or 1–6 carbon saturated aliphatic monocarboxylic acid esters of such ether alcohols. As noted above, however, any volatile, inert, normally-liquid solvents(s) can be used in practicing the invention, since the solvent component has no appreciable chemical effect on the resins and is simply used as a releasable and evanescent liquid carrier for the blended resins to enable them to be applied as a continuous, solvent-wet film. For can coating work, viscosities between about 13 seconds and 75 seconds (No. 4 Ford cup. 20° C.) are desirable.

The following solvent mixtures illustrate typical formulations which have been found to be satisfactory from both a cost and a commercial perforrmance standpoint. All percentages are expressed on a weight basis.

*Roll coat formulations*

| | Percent |
|---|---|
| (1) Xylol | 70 |
| Isophorone | 10 |
| 2-nitropropane | 20 |
| (2) Xylol | 88 |
| Isophorone | 6 |
| 2-nitropropane | 6 |
| (3) Xylol | 70 |
| Methyl isobutyl ketone | 20 |
| Isophorone | 10 |
| (4) Xylol | 78 |
| Isophorone | 17 |
| Acetone | 5 |
| (5) Xylol | 70 |
| Isophorone | 15 |
| Methyl isobutyl ketone | 10 |
| Ethyleneglycol monobutyl ether | 5 |
| (6) Xylol | 70 |
| Methyl isobutyl ketone | 10 |
| Isophorone | 14 |
| Diethyleneglycol monomethyl ether | 6 |
| (7) Xylol | 75 |
| 2-nitropropane | 10 |
| Isophorone | 10 |
| Ethyleneglycol monomethyl ether acetate | 5 |
| (8) Xylol | 75 |
| 2-nitropropane | 12 |
| Isophorone | 8 |
| Diethyleneglycol monomethyl ether acetate | 5 |

*Spraying formulations*

| | Percent |
|---|---|
| (1) Toluol | 88 |
| Acetone | 6 |
| 2-nitropropane | 6 |
| (2) Toluol | 90 |
| Methyl isobutyl ketone | 6 |
| Acetone | 4 |
| (3) Toluol | 85 |
| Acetone | 5 |
| Methyl ethyl ketone | 6 |
| Ethyl acetate | 4 |

PREPARATION OF THE COATING COMPOSITION

The coating compositions can be prepared from the resins and the selected solvent component in any manner adapted to secure the desired homogeneous, single-phase solution. "Cold-cutting" procedures (dissolving the resin(s) in the solvent component at ambient room temperatures) are practical and satisfactory. To hasten the operation, however, the resulting mixture can be heated moderately (e.g. at 120–130° F.). The procedure we prefer is to dissolve the Class C and/or Class D resin(s) in the selected solvent component then sift in the powdered Class A and/or Class B resins, and finally heat the resulting mixture at 120–130° F.

APPLICATION AND BAKING OF THE COATINGS

The coating compositions (either clear or pigmented as desired) used in practicing the invention can be applied to surfaces of formed containers and closures or to sheet stock from which containers and/or closures are to be fabricated by any of the usual means, such application being for example by roller coating, spraying, knifing, etc. The compositions can be adapted particularly for roller coating since the solvency characteristics of the film-forming materials permit the use of solvent mixtures which have little or no harmful effects on the resilient material of the rollers such as occurs when prior can coatings having higher proportions of ketones and other strong solvents are used. Our coatings are also advantageous in respect to any of the conventional application methods since their higher resinous solids contents permit thicker baked films to be secured per layer of applied wet film. This permits an increased rate of production per applied unit of baked film thickness, and this latter benefit is accompanied with lower lost-solvent charges. This reduction in solvent charges can be of the order of 65% based on present costs of solvents in ketone-soluble vinyl chloride/vinyl acetate sanitary coatings, thereby saving as much as 17 cents per pound of applied resin.

To secure fusion, film-continuity and adhesion of the resin solids of the applied coating composition, aided by the strong solvents illustrated above, the metal article with its applied wet coating is baked at temperatures between 305° F. and 355° F. for periods of 3–11 minutes. Thermal decomposition of the resin solids at these temperatures is prevented, apparently by obscure functioning of the said fusion-aiding strong solvents. However, to further ensure absence of thermal decomposition of the resins with concomitant degradation in color of the resulting baked film, small amounts (e.g. .05–1% by wt., based on the total resin solids) of non-film-forming 1,2 epoxy compounds can be added as thermal stabilizers. Propylene oxide is our preferred stabilizer, but other compounds such as phenoxypropylene oxide, epichlorhydrin, ethylene oxide, diallyl ether monoxide and/or phenyl glycidyl ether can be used as well. Preferred amounts of such stabilizer(s) are .02–0.5% by wt.

While sanitary can lining coatings are usually unpigmented, linings for detergent cans or other cans can desirably be pigmented. Likewise where our coatings are used in other non-sanitary coating uses, pigmentation is frequently desired. Any of the conventional inorganic and/or metallic pigments can be used with or without conventional filler and/or extender pigments. Any desired quantity of total pigmentary material can be used, so as to achieve flat, semi-glossy and/or glossy baked films.

While the baked films secured through the practice of this invention can be applied to any substrate which is not harmed by the baking treatment, such as glass, ceramics, glass fibers, cement products, asbestos-cement products, etc., the invention is directed more particularly to the coating of metals of the kinds conventionally used in making cans or food-contacting metal components of containers for foods and beverages, such as aluminum, can-maker's-quality black iron, tin-plated iron, terne plate, chromated (HINAC) black plate, etc. As pointed out above, such metals can be coated directly with our coating composition or they can carry a priming or base coat on which our coating compositions are applied to provide a food-contacting topcoat. The can industry presently favors the use of basecoats in connection with containers intended to receive certain foods and beverages, and presently approves the use of certain oleoresinous, epoxy and/or butadiene/styrene copolymer basecoats. The latter are described fully in U.S. Patent 2,652,342, here incorporated by reference, and the former are well known in the can-coating industry.

The following formulations are used in the examples hereof and are representative of currently-used basecoats.

Basecoat A

(Oleoresinous)

This is an 11 gallon oil length rosin/bodied linseed-bodied tung/unbodied tung oil varnish in hydrocarbon solvents at 52% non-volatile matter and containing 60 p.p.m. of manganese napthenate drier with 120 p.p.m. of of iron octoate drier; viscosity 50″–60″ at 80° F. (No. 4 Ford cup); 7.9 lbs. per gallon. Applied films are baked 10 minutes at 410° F.

Basecoat B

(Hydrocarbon copolymer drying oil)

This is a sodium-polymerized butadiene 80%/styrene 20% copolymer drying oil made in accordance with Run A of U.S. Patent 2,652,342, then modified with maleic anhydride as per Run O of said patent and finally modified further with aluminum di(ethylacetoacetate) monolinoleate and ethyl acetoacetate to secure a final formulation corresponding to that of Example 13 of copending application Serial No. 818,514 now U.S. Patent 3,080,246 filed June 8, 1959, whose disclosure is here incorporated by reference. The applied composition is baked 10 minutes at 410° F.

Basecoat C

(Epoxy resin/urea/formaldehyde resin blend)

This is a basecoat formulated as follows:

| | |
|---|---|
| Epoxy resin [1] _____lbs__ | 10 |
| Butylated urea/formaldehyde resin solution (50% solids in 22 parts butanol and 28 parts xylol) _____gals__ | 1 1/16 |
| Ethyleneglycol monoethyl ether acetate ____gals__ | 1 7/16 |
| Diacetone alcohol _____gals__ | 1 7/16 |

[1] An epichlorhydrin/bisphenol epoxy resin having an epoxy equivalent of 1600–1900 and having an hydroxyl equivalent of 190; melting point is 117–135° C.

Applied film is baked 10 minutes at 410° F.

Referring now to the attached sheet of drawings it will there be seen that FIGURE I illustrates a metallic can body 1 the inside surface of which carries a baked resinous lining 2 composed of the resin formulation(s) described above. FIGURE II illustrates a metallic can body 3 having as an inside lining thereon a baked basecoat 4 and baked topcoat 5, the latter being composed of the resin formulationss described above. FIGURE III illustrates a flat metal sheet 6 having a baked lining 7 adhered directly to one face thereof, while FIGURE IV illustrates a flat metal sheet 8 having a baked basecoat 9 and a baked topcoat 10 carried on one face thereof. It will be understood from what has been said above that topcoats 7 and 10 of FIGURES III and IV respectively are composed of the resin formulations described hereinabove as laid down from the organic solvent solutions also described above. It will also be understood that the coated sheets of FIGURES III and IV can be used to provide can ends for the can bodies of FIGURES I and II.

The following examples illustrate the principles of our invention and include the best modes presently known to us for carrying out these principles.

The tests referred to in the examples are carried out in the following manner.

(A) A flat sheet of the coated can stock is placed in a punch press and three standard can ends are punched out. The punching operation is effected by means of a pair of dies which not only shear the desired disc from the sheet but which also draw the stock into the conventional form wherein several spaced-apart concentric shallow, circular ribs are formed in the disc. The formation of said ribs is a necessary part of the test, since the drawing operation subjects the test film to heavy pressure while also deforming and stretching it. The ability of the test film to undergo this forming operating without cracking or otherwise failing is revealed by the "Fracture Test" described below.

(B) Three standard cans are filled with water and one of the test ends is crimped to each to seal the water within.

(C) The three cans are then placed in a thermocouple-controlled tank of water which has already been heated to and stabilized at 140°–150° F. (or 170° F. in some instances) with the test end of each can down. The cans are allowed to remain in the 140°–150° F. water for 30 minutes (or 15 minutes in the case of the 170° F. test), after which they are removed and allowed to stand test-end down overnight (16–17 hours).

(D) Each can is opened on a common household type rotary can opener, by cutting out the non-test end of the can. Then the water is poured out.

(E) The opened cans with their test ends in place are then partially filled with a standard copper sulfate solution and allowed to stand for two hours, thereby to permit the copper sulfate to work on the test end.

(F) Then the copper sulfate is poured out and the can is rinsed with water. Then the test end of each can is cut out on the said can-opener and is allowed to dry.

(G) "Scotch" brand tape (½″ wide) is applied to the test film of each test end and quickly pulled off. The amount of film removed from each test end is then evaluated on a scale of 0 to 10, zero representing no removal and 10 representing full removal. This is the "Adhesion" test.

(H) Each can end is then evaluated for "Fracture" by examining the test end from the test film side. Any copper sulfate which has worked its way through the test film to the metal leaves a blackish residue at the point of contact with the metal. If no such residue is observed the "Fracture" rating is zero. If a large number of sites of residue are seen, the rating is 10.

(I) Each can end is also examined for the presence of cloudy whitish areas of discoloration in the test film, called areas of "blush." If no such areas or spots are seen the rating for "blush resistance" is zero. If substantially the whole end is covered with such areas, the rating is 10.

The wedge bend test

The apparatus for this test consists of a heavy steel base or die carrying a vertical track on which slides a flatfaced weight having a weight of 2.3 kilograms. The upper face of the base has a beveled slot machined into it, one edge of the slot being flush with the said upper face and the other edge being recessed below the face about .020″. The slot has a flat bottom which extends between said edges. Thus the base constitutes a die in which a metal sample can be deformed from a flat sheet into a sheet having a controlled rate of bevel or taper in a test portion thereof. The weight is raised to a height of 29″ above the upper face of the base and is allowed to drop from there.

In the test a metal specimen having the desired test coating thereon is placed flatwise in the slot of the base with the test coating uppermost. The weight is then dropped on it. The specimen is then removed and examined. If the coating lacks adequate flexibility it will fracture, with the fracturing beginning at the thin edge of the tapered portion. The evaluation of the test film is made by assessing the ratio of the width of the fractured area to the total width of the specimen. If the specimen is 1 inch wide and the coating fractures over an area of one-quarter inch from the thin edge of the tapered portion, then the rating is 25% failure. This is a severe test for flexibility under impact.

EXAMPLE 1

A coating composition adapted for use in lining beer cans is formulated as follows:

| | |
|---|---|
| Class A copolymer resin [1] | 184 g., 92.9%. |
| Class D copolymer resin [2] | 14 g., 7.1%. |
| Toluene (93% of total solvents) | 744 g., 93%. |
| Acetone (3% of total solvents) | 24 g., 3%. |
| Methyl isobutyl ketone (4% of total solvents) | 32 g., 4%. |

[1] A resin prepared by emulsion-polymerization from 76.3% vinyl chloride and 23.7% commercial di-n-butyl maleate (containing 40–50% di-n-butyl fumarate) with 2.9% trichloroethylene. The monomers were polymerized in accordance with Example 1 of Reissue Patent No. 24,206 except for the indicated changes in monomer proportions. Relative viscosity 1.35.

[2] 91% vinyl chloride, 3% vinyl acetate, 6% vinyl alcohol; commercial VAGH resin.

The resins are dissolved in the mixed solvents by first dissolving the Class D resin in a mixture of the acetone and methyl isobutyl ketone. Then the toluene is added, after which the Class A resin, in powdered form, is sifted in. The whole mass is then heated to 120–130° F. and held at this temperature until all the resin has dissolved. The resulting solution is finally filtered. The resulting solution is roll-coated on sheets of iron can stock previously coated individually with a dry film of Basecoat A, Basecoat B and Basecoat C, above, to form a film weighing about 5–6 mgs. per square inch. The coated sheets are baked for 11 minutes at 305° F. or 3 minutes at 355° F. or for intermediate times at intermediate temperatures.

The coated and baked sheets exhibit good results in the tests for blush resistance (carried out for 30 minutes at 140° F.), for adhesion and for fracture, all of which establish the excellent continuity of the baked film on the test specimens.

EXAMPLE 2

When the Class D copolymer resin of Example 1 is replaced with a Class C copolymer resin* identified below and Example 1 is otherwise duplicated, substantially duplicate results are secured.

EXAMPLE 3

A coating composition suitable for lining beverage cans is formulated as follows:

| | |
|---|---|
| Neutral Class A resin of Example 1 | 245 g., 98%. |
| Reactive Class D resin of Example 1 | 5 g., 2%. |
| Xylene | 690 g., 92%. |
| Isophorone | 30 g., 4%. |
| Methyl isobutyl ketone | 30 g., 4%. |

The two resins are dissolved into the mixture of solvents in the manner described in Example 1. The resulting solution is roll-coated at 6–7 mgs. per square inch on can stock previously coated with a dry film of oleoresinous basecoat A supra, and the wet-coated sheet is baked 10 minutes at 350° F. Specimens of the coated sheet are processed for blush resistance, adhesion and fabrication test by pasteurizing for 30 minutes at 150° F. The following results are secured:

| | |
|---|---|
| Blush resistance | Good. |
| Adhesion | Good. |
| Fracture | Fair. |

EXAMPLE 4

The proportions of the resins of Examples 1 and 3, and the solvent component, are varied here as shown by the following formulation:

| | |
|---|---|
| Neutral Class A resin of Example 1 | 242.5 g., 97%. |
| Reactive Class D resin of Example 1 | 7.5 g., 3%. |
| Xylene | 675.0 g., 87.6%. |
| 2-nitropropane | 37.5 g., 4.9%. |
| Isophorone | 37.5 g., 4.9%. |
| Isopropanol | 20.0 g., 2.6%. |

*Vinyl chloride 86% by wt.; vinyl acetate 13–14% by wt.; maleic anhydride 1–2% by wt.; commercial VMCH resin.

When the resulting solution (prepared in the manner described in Example 1) is applied as a coating composition on basecoated can stock in the manner described in Example 3, and is similarly tested, the following results are secured:

| | |
|---|---|
| Blush resistance | Good. |
| Adhesion | Excellent. |
| Fracture | Fair. |

EXAMPLE 5

A coating composition of the invention is prepared from the following materials:

| | |
|---|---|
| Neutral Class A resin of Example 1 | 190 g., 95%. |
| Reactive Class C resin [1] | 10 g., 5%. |
| Xylene | 350 g., 70%. |
| Isoporone | 50 g., 10%. |
| 2-nitropropane | 100 g., 20%. |

[1] Commercial VXCC resin, identified supra.

The resins are dissolved in the mixed solvents at room temperature in the manner described in Example 1. The resulting solution is applied to bare tin-plate and to tin-plate previously primed with a dry film of oleoresinous basecoat A, supra, by drawing the composition over the priming coat with a drawdown bar, to provide 6–7 mgs. of coating per square inch. The coated sheets are baked 10 minutes at 340° F. and specimens thereof are pasteurized 30 minutes at 150° F. and then tested for the indicated qualities.

| | |
|---|---|
| Blush resistance | Good. |
| Adhesion | Fair. |
| Fracture | Fair to good. |

EXAMPLE 6

The following kinds and proportions of monomers are made into Class A resins by emulsion-polymerizing same in the manner described in Example 1 of Reissue Patent No. 24206:

| | Monomer Mixture (percent by wt.) | | |
|---|---|---|---|
| Vinyl chloride | 55 | 75 | 65 |
| Di-cyclohexyl chloromaleate | | 20 | |
| Di-n-butyl maleate/fumarate | 45 | 5 | 35 |
| Trichloroethylene (on 100 parts of monomer) | 3 | 3 | 3 |

The resulting three resins are substituted one at a time on an equal weight basis for the Class A resin of each of Examples 1–5, and the resulting coatings are tested as indicated in the respective examples, with substantially identical results.

The inclusion of about 0.4% propylene oxide (based on the weight of dissolved resins) in the coating compositions ensures light colored baked films without otherwise altering the test results.

EXAMPLE 7

When the Class A resin of each of Examples 1–5 is replaced with an equal weight of a Class B resin identified below, and the resulting coatings are tested in the manners described in the respective examples, substantially identical results are secured.

The Class B resin is prepared in accordance with Example 1 of Reissue Patent No. 24,206 except that the monomers and their proportions were:

| | Percent |
|---|---|
| Vinyl chloride | 75 |
| Commercial di-n-butyl maleate/fumarate | 13 |
| 2-ethylhexl acrylate | 12 |
| Trichloroethylene (on 100 parts monomer) | 1.7 |

The relative viscosity of the resulting resin is 1.32–1.38.

EXAMPLE 8

The following kinds and proportions of monomers are made into Class B resins by emulsion-polymerizing same in the manner described in Example 1 of Reissue Patent No. 24,206:

|  | Monomer Mixture (percent by wt.) | | |
| --- | --- | --- | --- |
| Di-n-butyl maleate/fumarate | 20 | 20 | 5 |
| 2-ethylhexyl acrylate | 5 | 5 | 20 |
| Vinyl chloride | 60 | 75 | 75 |
| 2-ethylhexyl methacrylate | 15 | | |
| Trichloroethylene (on 100 parts monomer) | 1.7 | 1.7 | 9.7 |

The resulting 3 resins are used one by one in place of the Class B resin of Example 7, and the resulting coating compositions are applied, baked and tested in the manners described in Example 7, with substantially equivalent results.

EXAMPLE 9

The Class B resin of Example 7 is there replaced with an equal weight of only one of each of the resins secured by emulsion-polymerizing the monomer formulation of Example 7 in accordance with:

(A) Example 1 of U.S. 2,849,422
(B) Example 1 of U.S. 2,849,423
(C) Example 1 of U.S. 2,849,424

When the five respective groups of three coating compositions resulting from the above replacements are applied, baked and tested in the manners described in Examples 1–5 respectively, no significant differences in result can be detected.

EXAMPLE 10

The Class A resin of the coating formulations of each of Examples 1–5 is replaced with an equal weight of only one of each of the resins secured by emulsion-polymerizing the monomer formulation of Example 1 in accordance with:

(A) Example 1 of U.S. 2,849,422
(B) Example 1 of U.S. 2,849,423
(C) Example 1 of U.S. 2,849,424

When the five respective groups of three coating compositions resulting from the above replacements are applied, baked and tested in the manners described in Examples 1–5 respectively, no significant differences in result can be detected.

EXAMPLE 11

When half of the Class A resin of Examples 1–5 is replaced with an equal weight of the Class B resin of Example 7, (thereby to secure a 50/50 mixture of Class A and Class B resins), the coating compositions so secured can be applied, baked and tested in the manners dencribed can be applied, baked and tested in the manners described in Examples 1–5 respectively without detectable differences in result.

Having described our invention, what we claim is:

1. A coating composition whose liquid film-forming vehicle (a) is a homogeneous single-phase solution of a blend of the resinous materials I and II identified below in inert, volatile organic solvent and (b) lays down a continuous, pore-free baked film adapted for non-injurious prolonged contact with foods and beverages when a wet applied film thereof is baked for 3 to 11 minutes at 305° F. to 355° F., said blend of resinous materials consisting essentially of (I) 90–99% by weight of neutral resin selected from the group consisting of Class A resins, Class B resins, and mixtures thereof, (1) in which the Class A resins are binary copolymers composed essentially of 55–77% by wt. of vinyl chloride and 45–23% by weight of neutral diesters of α,β unsaturated α and β dicarboxylic acids selected from the group consisting of maleic acid, chloromaleic acid and fumaric acid, each alcohol radical of said diesters being a hydrocarbon radical of 1–10 carbon atoms free of ethylenic unsaturation, (2) in which the Class B resins are ternary copolymers composed essentially of 55–80% by wt. of vinyl chloride, 3–23% by wt. of neutral esters of α,β unsaturated α and β dicarboxylic acid selected from the group consisting of maleic acid, chloromaleic acid and fumaric acid, each alcohol radical of said diesters being a hydrocarbon radical of 1–10 carbon atoms free of ethylenic unsaturation, and 1–22% by wt. of neutral alkyl esters of an α,β unsaturated monocarboxylic acid selected from the group consisting of acrylic acid and methacrylic acid, each alkyl group thereof containing 6–12 carbon atoms, and (3) in which said Class A and Class B resins, respectively, have a relative viscosity of 1.27–1.60 as measured at 20° C. in a 1% by wt. cyclohexanone solution thereof; and (II), 1–10% by wt. of reactive resin selected from the group consisting of Class C resins, Class D resins and mixtures thereof, (a) in which the Class C resins are ternary copolymers composed essentially of 65–91% by wt. of vinyl halide, 9–35% by wt. of vinyl ester of 1–6 carbon aliphatic monocarboxylic acid, and an acidic component whose acidic content is equivalent to .2–5% by wt. of maleic anhydride, said acidic component being selected from the group consisting of maleic anhydride, maleic acid, fumaric acid and 1–6 carbon monoalkyl esters of the latter acids, (b) in which the Class D resins are partially hydrolyzed products of a binary copolymer consisting essentially of residues of 65–91% by wt. of vinyl halide and 9–35% by wt. of vinyl ester of 1–6 carbon aliphatic monocarboxylic acid, said partially hydrolyzed product containing 3–10% by wt. vinyl alcohol residue and a content of unhydrolyzed vinyl ester residue amounting to at least 3% by wt., and (c) in which the Class C and Class D resins respectively have a molecular weight between 5,000 and 20,000 as measured by the Staudinger viscosity method.

2. A composition as claimed in claim 1 wherein the Class A and Class B neutral resins have been emulsion polymerized in the presence of 1.5–6.5% of trichloroethylene, said percentage being by weight based on 100 parts of monomer.

3. A composition as claimed in claim 2 wherein the Class C and Class D reactive resins have molecular weights between about 8,000 and 14,000.

4. A composition as claimed in claim 3 wherein the Class A resin is composed essentially of 65–77% vinyl chloride and 33–23% of neutral diesters and has a relative viscosity of about 1.30–1.50; wherein the Class B neutral resin consists of residues of about 67–75% vinyl chloride, about 6–20% of neutral diesters and about 6–20% of neutral acrylic esters, and has a relative viscosity of about 1.30–1.50; wherein the Class C reactive resin consists essentially of vinyl chloride as the vinyl halide, of vinyl acetate as the vinyl ester, and of maleic anhydride as the acidic component; and wherein the Class D reactive reaction is the partial hydrolysis product of a binary copolymer consisting essentially of residues of vinyl chloride as the vinyl halide and of vinyl acetate as the vinyl ester.

5. A composition as claimed in claim 4 wherein the Class A neutral resin is composed essentially of about 76.3% vinyl chloride and about 23.7% of di-n-butyl maleate/fumarate mixture in which the di-n-butyl fumarate amounts to about 50% based on the total weigh of said maleate/fumarate, and has been emulsion polymerized in the presence of about 2.9% of added trichlorethylene to a relative viscosity of about 1.35; wherein the Class B neutral resin consists essentially of residues of about 75% vinyl chloride, about 13% of di-n-butyl malleate/fumarate mixture in which the di-n-butyl fumarate amounts to about 50% based on the total weight of said maleate/fumarate, and has been emulsion polymerized in the presence of about 1.7% of added trichloroethylene to a relative viscosity between about 1.32 and 1.38; wherein said Class C reactive resin consists of residues of about 86% vinyl chloride, about 13% vinyl acetate and 1–2% of maleic anhydride; and wherein the Class D reactive resin, after hydrolysis consists of residues of about 91% vinyl chloride, about 3% vinyl acetate and about 6% vinyl alcohol.

6. A coated metal container component having an exposed internal lining thereon adapted to contact edible products when in use, said exposed lining being composed essentially of the blended resinous film-forming materials secured by applying to said article a wet film of the composition claimed in claim 1 and baking same for 3–11 minutes at 305° F.–355° F.

7. A coated metal container component having an exposed internal lining thereon adapted to contact edible products when in use, said exposed lining being composed essentially of the blended resinous film-forming materials secured by applying to said article a wet film of the composition claimed in claim 2 and baking same for 3–11 minutes at 305° F.–355° F.

8. A coated metal container component having an exposed internal lining thereon adapted to contact edible products when in use, said exposed lining being composed essentially of the blended resinous film-forming materials secured by applying to said article a wet film of the composition claimed in claim 3 and baking same for 3–11 minutes at 305° F.–355° F.

9. A coated metal container component having an exposed internal lining thereon adapted to contact edible products when in use, said exposed lining being composed essentially of the blended resinous film-forming materials secured by applying to said article a wet film of the composition claimed in claim 4 and baking same for 3–11 minutes at 305° F.–355° F.

10. A coated metal container component having an exposed internal lining thereon adapted to contact edible products when in use, said exposed lining being composed essentially of the blended resinous film-forming materials secured by applying to said article a wet film of the composition claimed in claim 5 and baking same for 3–11 minutes at 305° F.–355° F.

References Cited by the Examiner
UNITED STATES PATENTS

| | | | |
|---|---|---|---|
| Re. 24,206 | 8/1956 | Rowland et al. | 260—873 |
| 2,299,433 | 10/1942 | Stoner et al. | 260—899 |
| 2,512,726 | 6/1950 | Penn et al. | 260—899 |
| 2,849,422 | 8/1958 | Rowland et al. | 260—873 |
| 2,849,423 | 8/1958 | Rowland et al. | 260—899 |
| 2,849,424 | 8/1958 | Rowland et al. | 260—899 |
| 2,999,771 | 9/1961 | Gaynes | 260—899 |

SAMUEL H. BLECH, *Primary Examiner*

WILLIAM H. SHORT, *Examiner.*